May 14, 1963 F. F. JOHNSON 3,089,954
WELL LOGGING APPARATUS
Filed June 20, 1956
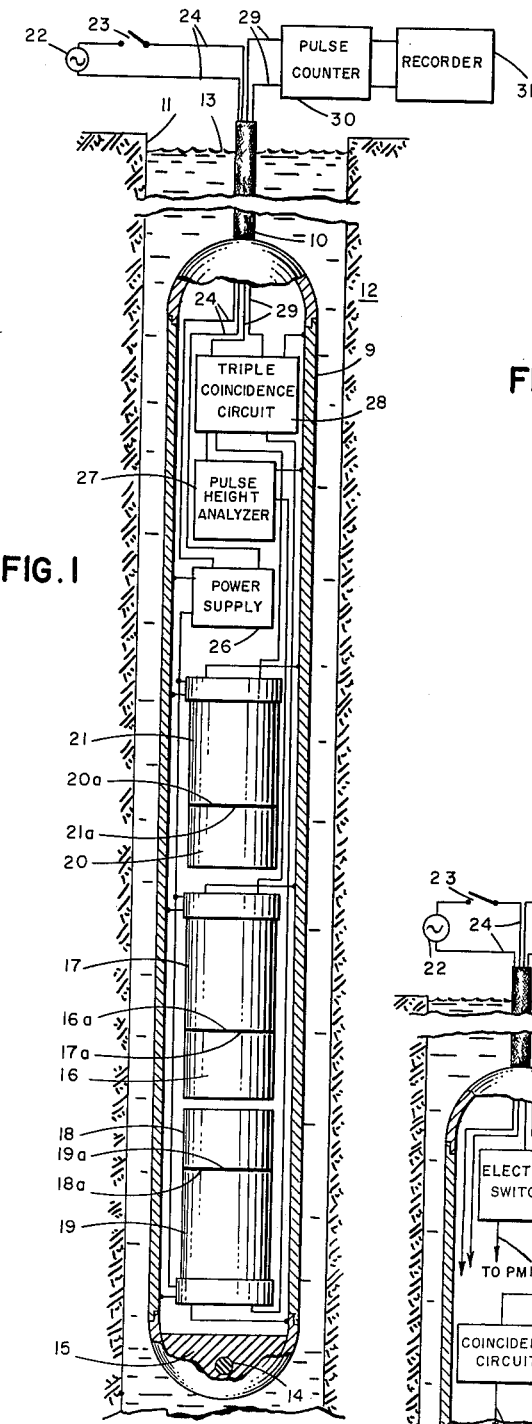
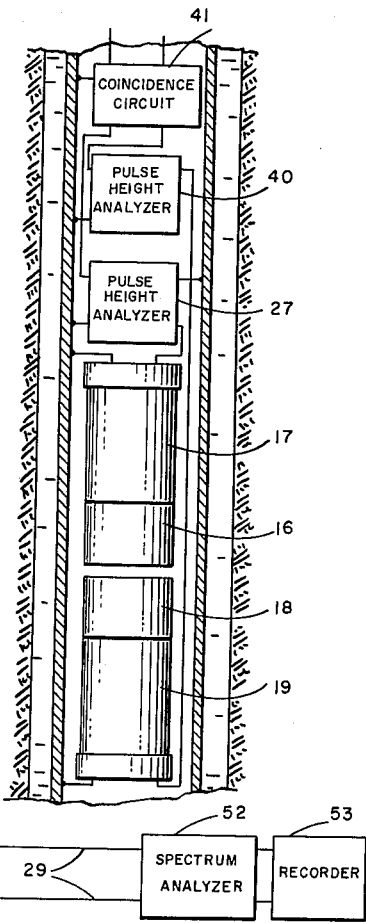
FIG.1
FIG.2
FIG.3
INVENTOR.
FRANK F. JOHNSON
BY Robert Hockfield
HIS ATTORNEY United States Patent Office 3,089,954
Patented May 14, 1963

3,089,954
WELL LOGGING APPARATUS
Frank F. Johnson, Danbury, Conn., assignor, by mesne assignments, to Schlumberger Well Surveying Corporation, Houston, Tex., a corporation of Texas
Filed June 20, 1956, Ser. No. 592,557
6 Claims. (Cl. 250—71.5)

This invention relates to well logging apparatus and, more particularly, pertains to new and improved radiation detecting apparatus for obtaining indications of gamma radiation emitted by, induced in, or scattered by the formations traversed by a borehole and/or by the fluid contained in the borehole.

Information concerning the types and relative numbers of atoms in earth formations under investigation can be obtained by analysis of the gamma radiation given off when the formations are irradiated by neutrons. To this end, it has been proposed that a source of neutrons be lowered in a borehole together with a scintillation detector providing output pulses of amplitudes dependent upon the energies of incident gamma rays. These output pulses are usually supplied to a conventional pulse height discriminator and thus some indication of the flux of gamma radiation at selected energy levels may be derived.

As is well understood, gamma radiation can interact with matter to an appreciable extent by three processes. These processes known as photoelectric absorption, Compton scattering, and pair production, give rise to different size pulses in scintillation apparatus. Consequently, accurate selection of a gamma ray energy band in conventional scintillation apparatus may not always be possible.

It is an object of the present invention, therefore, to provide new and improved well logging apparatus of the radioactivity type affording more accurate indications of a desired portion of a gamma ray energy spectrum than heretofore possible.

Another object of the present invention is to provide new and improved scintillation spectrometer apparatus for use in a well or borehole in which one of the three processes by which gamma radiation interacts with a scintillation element is employed substantially to the exclusion of the other processes.

Yet another object of the present invention is to provide a new and improved scintillation spectrometer for use in boreholes in which indications are obtained substantially only in response to pair production interactions in a scintillation element caused by radiant energy present in the borehole.

Well logging apparatus in accordance with the present invention comprises principal and auxiliary radiant energy responsive elements disposed adjacent to one another, the principal radiant energy responsive element being exposed to radiant energy present in a borehole and the auxiliary radiant energy responsive element being exposed to radiant energy emitted by the principal radiant energy responsive element. The radiant energy responsive elements provide respective first and second electrical pulse signals. The apparatus further comprises means responsive to the first and second electrical pulse signals for deriving an output signal representing time coincident pulses and the output signal is utilized to obtain indications of a characteristic of radiant energy present in the borehole.

In a specific embodiment of the invention, another auxiliary scintillation element is employed and is exposed to radiant energy from the principal scintillation element. Means are provided for converting light energy emitted from the other auxiliary scintillation element into a third electrical pulse signal. The means responsive to the first and second pulse signals is also responsive to the third electrical pulse signal to derive an output signal only in the presence of three time coincident pulses.

In accordance with another embodiment of the invention, output pulses representing radiation incident on the principal scintillation element are supplied to an analyzer only in the presence of pulses from an auxiliary scintillation element. Thus, continuous spectrum analysis of radiation on the principal element may be performed.

The novel features of the present invention are set forth with particularity in the appended claims. The present invention, both as to its organization and manner of operation, together with further objects and advantages thereof, may best be understood by reference to the following description taken in connection with the accompanying drawing in which:

FIG. 1 is a schematic representation of radioactivity well logging apparatus of the scintillation spectrometer type disposed within a borehole and constructed in accordance with the present invention; and FIGS. 2 and 3 represent modifications which may be made to the apparatus of FIG. 1.

In FIG. 1 of the drawing, there is shown a pressure-tight housing 9 supported by an armoured cable 10 in a borehole 11 that is drilled through earth formations 12. The borehole 11 may or may not contain a drilling fluid 13, such as a water or oil base mud. Cable 10 is employed together with a winch (not shown) to lower and raise the housing 9 in the usual manner.

At the lower end of housing 9 there is disposed a neutron source 14 which may, for example, be a conventional mixture of radium and beryllium enclosed by a gamma ray shield 15. Neutrons emanating from source 14 irradiate earth formations 12 and give rise to gamma radiation. Apparatus embodying the present invention may be utilized in the analysis of such gamma radiation directed toward housing 9.

A principal scintillation element 16 is supported within the housing 9 and may be of conventional composition intended to convert incident gamma radiation into light energy. For example, scintillation element 16 may be composed of sodium iodide in solid crystalline form and of cylindrical configuration. A photomultiplier 17 is supported within housing 10 with its photo-cathode end 17a facing downwardly and optically coupled to upper, flat end 16a of scintillation element 16.

Supported below scintillation crystal 16 is an auxiliary scintillation element 18. Preferably, scintillator 18 is similar to scintillator 16 and is positioned relatively close so that it can intercept emitted radiation under conditions to be described hereinafter. Scintillator 18 has its lower, flat end 18a immediately adjacent and optically coupled to the upwardly facing photo-cathode end 19a of another photomultiplier 19.

Another auxiliary scintillation element 20 which may also be similar to scintillator 16 is supported above photomultiplier 17 with its upper, flat end 20a optically coupled to the photo-cathode end 21a of a photomultiplier 21. Preferably, photomultiplier 17 should have a length such that scintillation element 20 can be positioned close enough to scintillation element 16 to respond to gamma radiation therefrom.

Since the scintillators 16, 18 and 20 are of cylindrical construction, as are the photomultipliers 17, 19 and 21, all may be conveniently arranged with their longitudinal axes aligned with the longitudinal axis of housing 9 in the manner shown in FIG. 1.

Of course, although not shown, the usual potting techniques may be employed to moisture-proof the scintillators, and the optical coupling between a scintillator and its photomultiplier may be improved with the use of compounds generally employed for this purpose. If desired, hollow, cylindrical gamma ray shields may be provided for auxiliary scintillators 18 and 20, and a gamma ray transparent light shield may be disposed between scintillators 16 and 18.

To energize the equipment within housing 9, a source of electrical energy 22 having an operating switch 23 is connected via insulated conductors 24 of cable 10 to a conventional power supply 26 located within the housing. The power supply provides the necessary high voltage for the operation of the photomultipliers 17, 19 and 21 and the lower voltages required for the operation of various other components.

The output circuit of photomultiplier 17 is coupled to a conventional pulse height analyzer 27 which provides output pulses of uniform height and duration in response to applied pulses having an amplitude within a predetermined range of amplitudes. Analyzer 27 is coupled to one input circuit of a conventional triple coincidence circuit 28, the remaining input circuits of which are coupled to the output circuits of photomultipliers 19 and 21, respectively. Circuit 28 is arranged in a known manner to provide an output pulse only in response to the occurrences of three time coincident pulses at its three input circuits. This output signal is supplied over conductors 29 of cable 10 to a conventional pulse counter 30 at the surface of the earth, in turn, coupled to a recorder 31. The recorder may be synchronized in any conventional manner with movement of housing 9 through borehole 11 so that the recorded indications may be related to the position of housing 9 within the borehole.

If desired, the output signals from the photomultipliers 17, 19 and 21 may be amplified in respective amplifiers (not shown) before application to elements 27 and 28.

Before discussing the operation of the apparatus just described, it may be helpful to explain the problem overcome by the present invention. As mentioned hereinbefore, gamma radiation interacts with matter, such as the material of a scintillation element, by the processes known as photoelectric absorption, Compton scattering and pair production.

In a photoelectric interaction, an incident gamma ray loses all of its energy and the intensity of the resulting light flash is representative of the energy of the gamma ray. In general, for the scintillation materials now in use, such as sodium iodide, photoelectric interactions occur with high probability at relatively low energy, say less than one million electron volts (m.e.v.). These may be ignored in the practice of the invention which is primarily useful in the measurement of gamma radiation of higher energies.

Gamma rays at high energy may interact with atoms either through Compton scattering or pair production. In Compton scattering a gamma ray incident on an atom produces an electron and another gamma ray having an energy dependent upon the angular relationship of these products to the incident gamma ray photon. As the electron traverses the scintillation material, it loses its energy with an attendant light flash. If the product gamma ray is completely absorbed in the scintillator in some manner with a resultant light flash, the total light energy is representative of the energy of the incident gamma ray energy. However, if the scintillation element is not physically large enough to absorb all of the product gamma radiation, the intensity of any light flash may not reliably denote the energy of the incident gamma ray. This may be true of scintillators intended for borehole use where cylindrical elements less than two inches in diameter and on the order of two inches in length are common, in contrast to scintillation elements at least five times as large required for complete absorption.

Referring now to pair production interactions, in response to each gamma ray of an energy above one m.e.v. incident on a scintillator, a positron and an electron are produced with the complete absorption of the gamma ray. The positron and the electron traverse the scintillator and produce light of an intensity approximately equal to the energy of the incident gamma ray minus one m.e.v. In addition, when the positron finds an electron there is an interaction resulting in the emission of two photons having energies of 0.5 m.e.v. The photons, usually termed annihilation radiation, travel in opposite directions and are indicative of a pair production interaction. They are utilized in the practice of the present invention to distinguish pair production interactions from other interactions.

In operation, switch 23 is closed to energize power supply 26 and housing 9 is passed through borehole 11 in the usual manner. Neutrons emitted by source 14 interact with constituent material in earth formations 12 to produce gamma radiation by known processes and some of this radiation travels toward housing 10 and enters principal scintillator 16.

In response to each quantum of gamma radiation incident on scintillation element 16, light energy may be emitted as a result of a pair production interaction having an intensity representing the energy of the incident quanta minus one m.e.v. Such light energy is converted by photomultiplier 17 into an electrical pulse having an amplitude representing the light intensity and all such pulses falling within the amplitude range of pulse height analyzer 27 are passed to triple coincidence circuit 28.

As mentioned above, a pair production interaction is accompanied by the emission of oppositely traveling annihilation rays and these may be directed so as to impinge on scintillation elements 18 and 20, respectively. Each of the resultant interactions produces a light flash that is converted into a corresponding electrical pulse by the associated one of photomultipliers 19 and 21. Accordingly, in addition to the pulse from analyzer 27, pulses from the photomultipliers are fed to coincidence circuit 28 which develops a pulse for application to counter 30 at the surface of the earth.

For interactions in scintillation element 16, other than pair production, no annihilation gamma rays are produced and there can be no output pulses from coincidence circuit 28. Thus, the pulses applied to counter 30 are representative only of pair production interactions.

Since the pulses from circuit 28 are counted in unit 30, a voltage is derived for application to recorder 31 representing the flux of gamma radiation at the energy level set by pulse height analyzer 27. This voltage is recorded as a function of depth of housing 9 in the borehole 11 to provide continuous indication of the selected energy characteristics of gamma rays present in the borehole.

Obviously, by adjusting the amplitude range of pulses processed by pulse height analyzer 27, the resulting log may be indicative of any desired range of gamma radiation energies. It is thus evident that through the use of radioactivity well logging apparatus embodying the present invention, more accurate indications of a desired band of energies may be obtained.

The apparatus illustrated in FIG. 1 may be modified in the manner represented in FIG. 2 where identical elements are denoted by the same reference numerals. Scintillation elements 20 and photomultiplier 21 need not be employed, but photomultiplier 19 is coupled to a pulse height analyzer 40, in turn, coupled to one input circuit of a double coincidence circuit 41 having its other input circuit coupled to pulse height analyzer 27.

Analyzer 40 is set to pass pulses in an amplitude range representative substantially only of annihilation radiation resulting from pair production. In other words, only when annihilation quantum enters scintillation element 18 from scintillation element 16 is a pulse supplied to coincidence circuit 41 at the same time a pulse is supplied in response to a light flash in scintillation element 16.

Since only one annihilation quantum is employed in scintillation element 18, the remaining quantum may be absorbed in scintillation element 16 where it is born. Accordingly, gamma rays of one energy produce two sizes of pulse heights. However, since the ratio of pulses of one height to those of the other is constant, this ratio can be accurately calculated or measured and the gamma radiation in the selected energy range may be easily determined.

Continuous spectrum analysis may be performed in apparatus embodying the present invention. For example, as shown in FIG. 3, a double coincidence circuit 50 may be supplied with the output signal of photomultipliers 19 and 21 of FIG. 1. Pulses from circuit 50 are used to control a conventional electronic switch 51 whose input circuit is coupled to photomultiplier 17 and whose output circuit is coupled to a conventional pulse height spectrum analyzer 52 at the surface of the earth. Analyzer 52 may, for example, provide a varying voltage representing pulse height distribution during each of repetitive scanning intervals and this signal is recorded in unit 53 to provide successive curves indicative of the energy spectrum of incident gamma radiation.

Since coincidence circuit 50 supplies a control pulse to electronic switch 51 only in the presence of coincident, annihilation rays, the switch is operative to translate only pulses from photomultiplier representing pair production interactions by gamma radiation incident on scintillation element 16. These pulses whose amplitudes are representative of gamma ray energy are processed by analyzer 52 and the entire spectrum is periodically recorded in recorder 53.

Although sodium iodide has been specified as a scintillation material, obviously others may be appropriately employed in the practice of the present invention. For example, such materials as potassium iodide, anthracene or napthalene are suitable. Of course, either solid or liquid scintillators may be employed.

Moreover, it is not necessary that all of the scintillation elements be alike. It is only necessary that the principal element, as the one designated by numeral 16 in FIG. 1, be responsive to gamma radiation from the earth formations under investigation, while the auxiliary elements 18 and 20 are responsive to annihilation rays from the principal element 16.

Although the invention has been described with specific reference to scintillation elements, obviously other radiant energy responsive devices may be employed. For example, three ionization chambers can be arranged in the same manner as the principal and auxiliary scintillators described above. Of course, various combinations of devices are possible. Thus, a scintillator and an associated photomultiplier can be responsive to incident radiant energy while Geiger counters are responsive to annihilation radiation resulting from pair production interactions in the scintillator.

While particular embodiments of the present invention have been shown and described, it is apparent that changes and modifications may be made without departing from this invention in its broader aspects and therefore the aim in the appended claims is to cover all such changes and modifications as fall within the true spirit and scope of this invention.

I claim:

1. Well logging apparatus comprising a housing adapted to be passed through a borehole and having an elongated tubular configuration defining a longitudinal axis, first, second and third scintillation elements of cylindrical form supported within the bore of said housing in unequally spaced alignment along said axis, first, second, and third photomultipliers of cylindrical form supported within the bore of said housing in spaced alignment with said axis, said first and second elements having adjacent confronting end faces which are light shielded and having remote end faces to which the respective first and second photomultipliers are optically coupled, said third element having an end face confronting said first photomultiplier and spaced thereby from said first element and having a remote end face to which said third photomultiplier is optically coupled, said first scintillation element being exposed to radiant energy transmitted through the wall of said housing and said second and said third scintillation elements being exposed to radiant energy emitted by said first scintillation element, and means electrically coupled with each of said photomultipliers for selectively deriving pair-production pulses from said first photomultiplier.

2. Well logging apparatus comprising a housing adapted to be passed through a borehole and having an elongated tubular configuration defining a longitudinal axis, first, second and third scintillation elements of cylindrical form supported within the bore of said housing in unequally spaced alignment along said axis, said elements each having a diameter substantially greater than one-half the diameter of said housing bore, first, second, and third photomultipliers of cylindrical form supported within the bore of said housing in spaced alignment with said axis, said first and second elements having adjacent confronting end faces which are light shielded and having remote end faces to which the respective first and second photomultipliers are optically coupled, said third element having an end face confronting said first photomultiplier and spaced thereby from said first element and having a remote end face to which said third photomultiplier is optically coupled, said first scintillation element being exposed to radiant energy transmitted through the wall of said housing and said second and said third scintillation elements being exposed to radiant energy emitted by said first scintillation element, and means electrically coupled with each of said photomultipliers for selectively deriving pair-production pulses from said first photomultiplier.

3. Well logging apparatus comprising a housing adapted to be passed through a borehole and having an elongated tubular configuration defining a longitudinal axis, first, second and third scintillation elements of cylindrical form supported within the bore of said housing in unequally spaced alignment along said axis, said elements having a uniform diameter substantially greater than one-half the diameter of said housing bore, first, second, and third photomultipliers of cylindrical form supported within the bore of said housing in spaced alignment with said axis, said first and second elements having adjacent confronting end faces which are light shielded and having remote end faces to which the respective first and second photomultipliers are optically coupled, said third element having an end face confronting said first photomultiplier and spaced thereby from said first element and having a remote end face to which said third photomultiplier is optically coupled, said first scintillation element being exposed to radiant energy transmitted through the wall of said housing and said second and said third scintillation elements being exposed to radiant energy emitted by said first scintillation element, and means electrically coupled with each of said photomultipliers for selectively deriving pair-production pulses from said first photomultiplier.

4. Well logging apparatus comprising a housing adapted to be passed through a borehole and having an elongated tubular configuration defining a longitudinal axis, first, second and third scintillation elements of cylindrical form supported within the bore of said housing in unequally spaced alignment along said axis, first, second and third photomultipliers of cylindrical form supported within the bore of said housing in spaced alignment with said axis, said elements and photomultipliers all having substantially the same uniform diameter which is substantially greater than one-half the diameter of said housing bore, said first and second elements having adjacent confronting end faces which are light shielded and having remote end faces to which the respective first and second photomultipliers are optically coupled, said third element having an end face confronting said first photomultiplier and spaced thereby from said first element and having a remote end face to which said third photomultiplier is optically coupled, said first scintillation element being exposed to radiant energy transmitted through the wall of said housing and said second and said third scintillation elements being exposed to radiant energy emitted by said first scintillation element, and means electrically coupled with each of said photomultipliers for selectively deriving pair-production pulses from said first photomultiplier.

5. Well logging apparatus comprising a housing adapted to be passed through a borehole and having an elongated tubular configuration defining a longitudinal axis, first and second scintillation elements of cylindrical form supported within the bore of said housing in alignment along said axis, first and second photomultipliers of cylindrical form supported within the bore of said housing in spaced alignment with said axis, said elements and photomultipliers all having substantially the same uniform diameter which is substantially greater than one-half the diameter of said housing bore, said first and second elements having adjacent confronting end faces which are light shielded and having remote end faces to which the respective first and second photomultipliers are optically coupled, said first scintillation element being exposed to radiant energy transmitted through the wall of said housing and said second scintillation element being exposed to radiant energy emitted by said first scintillation element, and means electrically coupled with each of said photomultipliers for selectively deriving pair-production pulses from said first photomultiplier.

6. Well logging apparatus comprising a housing adapted to be passed through a borehole and having an elongated tubular configuration defining a longitudinal axis, first and second scintillation elements of cylindrical form supported within the bore of said housing in alignment along said axis, first and second photomultipliers of cylindrical form supported within the bore of said housing in spaced alignment with said axis, said elements and photomultipliers all having substantially the same uniform diameter which is substantially greater than one-half the diameter of said housing bore, said first and second elements having adjacent confronting end faces which are light shielded and having remote end faces to which the respective first and second photomultipliers are optically coupled, said first scintillation element being exposed to radiant energy transmitted through the wall of said housing and said second scintillation element being exposed to radiant energy emitted by said first scintillation element, and means electrically coupled with each of said photomultipliers for selectively deriving coincident pulses from said first and second photomultipliers in response to pair production interactions when said first scintillation element is exposed to gamma rays of an energy above 1 mev.

References Cited in the file of this patent
UNITED STATES PATENTS 2,830,185     Scherbatskoy _____ Apr. 8, 1958

OTHER REFERENCES

Letter dated July 3, 1950, by Sven A. E. Johansson published at pp. 794, 795 in "Nature," Vol. 166, Nov. 4, 1950.

Article entitled "Three-Crystal Scintillation Spectrometer," by J. K. Blair and F. C. Maienschein in "Review of Scientific Instruments," Vol. 22, pp. 343, 344, 1951.

Article by Johansson in "Philosophical Magazine," Vol. 43, pp. 249–256, 1952.

Article by Maienschein, pp. 7–46 of U.S. AEC Oak Ridge National Lab. Publication, ORNL–1142, pub. April 14, 1952, declassified May 19, 1952.

Curran: "Luminescence and the Scintillation Counter," London, 1953, especially pp. 163–169 and FIGS. 76, 78.